(12) United States Patent
Tarver

(10) Patent No.: US 7,318,446 B1
(45) Date of Patent: Jan. 15, 2008

(54) PROTECTIVE HOUSING FOR PIPELINE

(76) Inventor: John Tarver, 500 Harvey, Bridge City, TX (US) 77611

( * ) Notice: Subject to any disclaimer, the term of this patent is extended or adjusted under 35 U.S.C. 154(b) by 429 days.

(21) Appl. No.: 11/015,835

(22) Filed: Dec. 20, 2004

(51) Int. Cl.
*F16K 35/00* (2006.01)
(52) U.S. Cl. ............... 137/382; 137/372; 52/91.1; 52/198; 89/36.04
(58) Field of Classification Search ............ 137/236.1, 137/372, 377, 382; 52/198, 199, 91.1, 302.3; 89/36.02, 36.04
See application file for complete search history.

(56) References Cited

U.S. PATENT DOCUMENTS

| | | | |
|---|---|---|---|
| 33,523 A | 10/1861 | Falke | |
| 1,520,288 A | 12/1924 | Featherstone | |
| 1,857,788 A | 5/1932 | Murphy | |
| 2,820,990 A * | 1/1958 | Johnson | 52/81.4 |
| 3,734,137 A | 5/1973 | Stanley | |
| 4,208,055 A | 6/1980 | Noensie | |
| 4,993,450 A * | 2/1991 | Dunn | 137/382 |
| 5,078,171 A * | 1/1992 | Moore et al. | 137/15.08 |
| 5,427,474 A | 6/1995 | Silvers | |
| 5,687,757 A | 11/1997 | Heintz | |
| 5,930,961 A * | 8/1999 | Beaudet | 52/169.6 |
| 6,021,804 A * | 2/2000 | Griffin et al. | 137/341 |
| 6,438,906 B1 * | 8/2002 | Komarowski et al. | 52/169.1 |
| 6,532,985 B1 * | 3/2003 | Griffin et al. | 137/341 |
| 6,561,215 B1 | 5/2003 | Wakefield | |
| 6,955,012 B2 * | 10/2005 | Suzuki | 52/198 |
| 2001/0018926 A1 | 9/2001 | Griffin | |
| 2004/0163337 A1 | 8/2004 | Claerbout | |

* cited by examiner

*Primary Examiner*—John Fox
(74) *Attorney, Agent, or Firm*—Egbert Law Offices

(57) ABSTRACT

A structure for protecting pipeline sections has a base, a housing affixed to the top surface of the base and having a plurality of side walls extending at an acute angle with respect to a top surface of the base, and an accessing door connected to the housing in a position above the base. The interior of the housing is vented to the atmosphere. The plurality of side walls includes a pair of triangularly-shaped walls and a pair of trapezoidally-shaped walls.

17 Claims, 3 Drawing Sheets

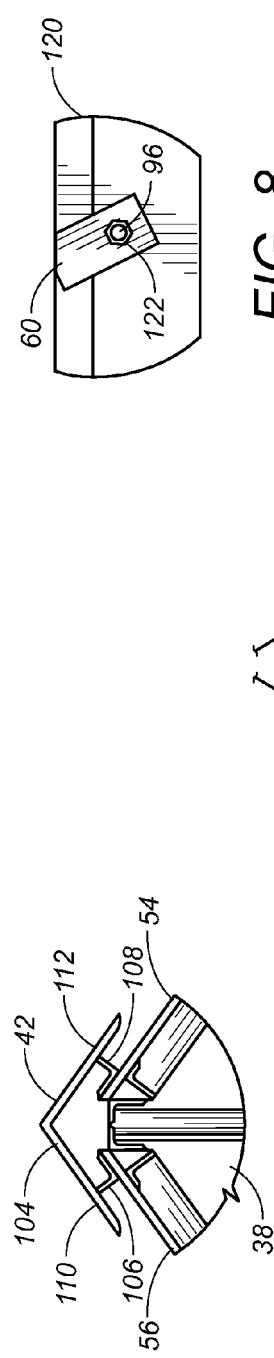
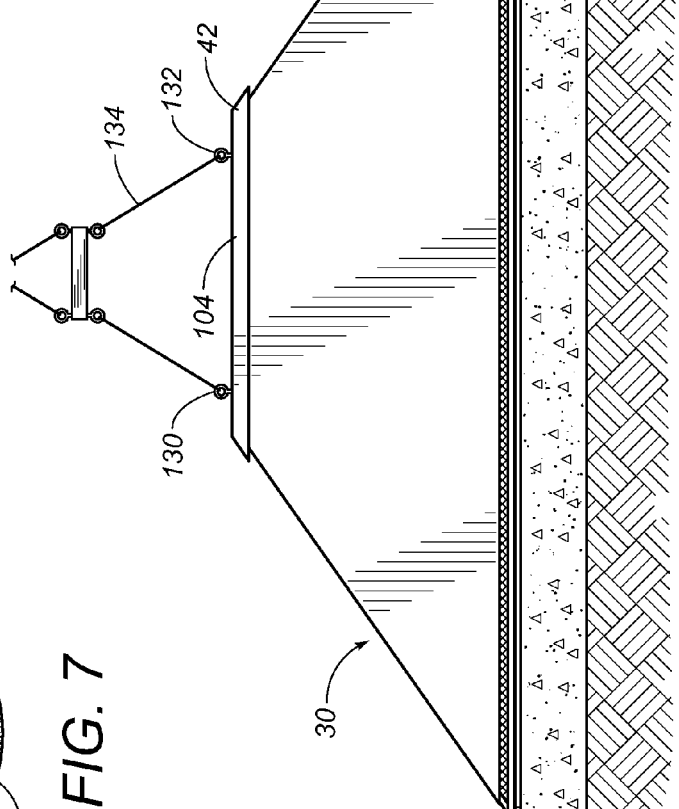

PROTECTIVE HOUSING FOR PIPELINE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to pipeline safety structures. More particularly, the present invention relates to housings that can be placed over exposed valving of pipelines. Additionally, the present invention relates to structures that are designed so as to prevent access to pipelines by undesired persons.

BACKGROUND OF THE INVENTION

Oil and gas pipelines extend virtually throughout the entire United States. Such pipelines are intended to convey oil and natural gas from a producing location to a storage or consuming location. These pipeline utilize suitable pressures, and other facilities, for the purpose of urging the oil and/or gas from one location to another. For security purposes, valves are positioned at spaced locations along the pipeline. The valves are intended to close off certain pipeline sections in the event of a rupture or damage thereto. Additionally, if there is an obstacle or obstruction within the pipeline, these valving sections can allow suitable access to the pipeline for repair and maintenance.

It is known to place these valving structures above the earth. It is very important to place the valving structures above the earth so that access to the valves can be obtained in a quick and easy manner. As a result, in the event of a pipeline rupture or other need for closing the pipeline, workers can easily access the valving structure so as to facilitate the closure of the pipeline and to prevent spillage, leakage or other undesired results from the open pipeline.

Since these valving structures are placed above the earth, they are in a convenient location for access by undesired personnel. In these days of national security concerns, the exposed sections of the pipeline present a very attractive target for terrorist activities. Since the valving structures are located above the earth, it would be relatively easy for a terrorist to place explosives in an area adjacent to the valving structure, to ram a vehicle into the valving structure, and direct missiles or other projectiles toward the pipeline structure. If the valving section of the pipeline is damaged to a considerable degree, then the ability to close the pipeline will be compromised. The supply of oil and gas through the pipeline associated with such valving section will be interrupted. As a result, a coordinated approach to the destruction of these valving sections could present a very serious national security concern and present a very serious concern relative to the ability to supply oil and gas for the nations needs. As a result, a structure for protecting such valving sections would be imperative.

In the past, various patents have issued with respect to protective structures. For example, U.S. Pat. No. 6,561,215, issued on May 13, 2003 to M. Wakefield, teaches an enclosure for natural gas wellheads. The enclosure has a fixed enclosure portion and a removable enclosure portion. The removable enclosure portion facilitates access to the wellhead, while the fixed enclosure portion protects the wellhead's computer and meter systems. The enclosure provides ventilation to prevent accumulation of natural gas within the enclosure in the event of a leak.

U.S. Pat. No. 5,687,757, issued on Nov. 18, 1997 to Heintz et al., describes an apparatus for guarding against vandalism and spillage of fluids from bulk fluid storage facilities. The apparatus includes a lockable enclosure mounted at the discharge end of the outlet pipe from a bulk fluid storage tank. A fluid shut-off valve is mounted in the enclosure. The enclosure has a lid which is mounted so that it can be properly closed only when the shut-off valve is fully closed. The enclosure can be locked to prevent vandals from opening the shut-off valve. When it is closed, the enclosure protects fluid in the receptacle from rain and prevents animals from getting into the fluid in the receptacle.

U.S. Pat. No. 33,523, issued on Oct. 22, 1861 to O. Falke, teaches a heated cover for pipeline backflow preventor component assemblies. The cover is sectionalized so as to be assembleable around the valve components. The cover includes drain openings at ground level to let any water drain out of the cover. Doors are provided in the cover to permit inspection and testing of the components when the cover is in place.

U.S. Pat. No. 3,734,137, issued on May 22, 1973 to R. L. Stanley, discloses a pipeline transmission system in which the pipeline is mounted on a elevated platform insulated from the ground surface. The pipe is enclosed within full-length insulated housing that contains service pipes, rails and the like.

U.S. Pat. No. 4,208,055, issued on Jun. 17, 1980 to Noensie et al., provides a method and device for sealing against the penetration of a pipeline in a wall of a submerged structure. The device is particularly designed for connecting two pipelines located beneath sea level wherein the end of one of the pipelines is located in a hollow structure and one of the sealing devices is connected thereto. The other end of the sealing device is sealingly connected to one end of a penetration sleeve which is sealingly connected through the wall of the structure.

U.S. Pat. No. 1,520,288, issued on Dec. 23, 1924 to P. P. Featherstone, discloses a pyramidal-shaped structure that can be lowered onto a fire for the purposes of extinguishing the fire, such as an oil well fire. U.S. Pat. No. 1,857,788, issued on May 10, 1932 to J. S. Murphy, discloses an alternate system whereby the housing is of a rectangular shape and can be lowered so as to completely cover an exposed gas or oil well fire for the purposes of extinguishing the fire.

U.S. Patent Publication No. US 2001/0018926, published on Sep. 6, 2001 to Griffin et al., discloses a housing that can maintained over the valving structure associated with the pipeline. The device is particularly configured so as to provide heat to the valving structures so as to avoid any thickening of the conveyed fluid by exposure to low temperatures. U.S. Patent Publication No. US 2004/0163337, published on Aug. 26, 2004 to A. Claerbout, describes a protective enclosure that is designed so as to provide protection from the blast of a high-temperature explosion. U.S. Pat. No. 5,427,474, issued on Jun. 27, 1995 to T. W. Silvers, teaches a double-containment piping system for securing a primary pipeline in position within a surrounding secondary pipeline which interconnects two or more sump chambers.

It is an object of the present invention to provide a protective housing for pipelines.

It is another object of the present invention to provide a protective housing which prevents access to the valving structure associated with the pipeline.

It is another object of the present invention to provide a protective housing whereby exposed portions of the pipeline can be protected against the actions of terrorists and others.

It is a further object of the present invention to provide a protective housing for pipelines whereby any explosions adjacent to the exposed portions of the pipeline will be deflected from the pipeline.

It is a further object of the present invention to provide a protective housing for pipelines that can be easily installed over the exposed portions of the pipelines.

It is another object of the present invention to provide a protective housing for pipelines whereby access to the valving structure of the pipeline can be obtained in a quick and efficient manner by authorized personnel.

It is a further object of the present invention to provide a protective housing for pipelines whereby the housing structure can be preassembled and simply lowered in position over the exposed portions of the pipelines.

These and other objects and advantages of the present invention will become apparent from a reading of the attached specification and appended claims.

BRIEF SUMMARY OF THE INVENTION

The present invention is a structure for protecting pipelines comprising a base, a housing affixed to the top surface of the base, and an access means connected to the housing in a position above the base. The housing has a plurality of side walls. Each of the plurality of side walls extends at an acute angle with respect to a top surface of the base. The access means allows access to the interior of the housing.

In the present invention, the base having a generally rectangular shape with a central opening. The central opening has a size suitable for allowing a portion of the pipeline to extend upwardly therethrough. The base is formed of a concrete material. The housing is affixed by a plurality of anchor bolts to the base. Each of the plurality of anchor bolts has a portion embedded in the concrete material.

The plurality of side walls comprises a pair of triangularly-shaped walls each having a wide edge at the base. The pair of triangularly-shaped walls are positioned at respective opposite ends of the housing. A pair of trapezoidal-shaped walls each has a wide edge at the base. The pair of trapezoidal-shaped walls are respectively positioned at opposite sides of the housing and between the pair of triangularly-shaped walls. The access means is a door that is hingedly affixed over an opening in one of the pair of trapezoidal-shaped walls.

The plurality of side walls defines an opening at a top end thereof. The opening serves to vent the interior of the housing to exterior atmosphere. The opening extends longitudinally along the top end. A cap is supported in spaced relationship over the opening. This cap includes an inverted V-shaped member having a pair of legs that extend outwardly over and beyond the opening. A first angle iron has a surface affixed to a surface of one of the plurality of side walls and another surface affixed to one of the pair of legs of the inverted V-shaped member. A second angle iron has a surface affixed to a surface to another of the plurality of side walls and another surface affixed to another pair of the legs of the inverted V-shaped member. The cap also has a pair of eyelets affixed to a top surface thereof and extending upwardly therefrom.

In the present invention, each of the plurality of side walls comprises a first plurality of angle irons extending horizontally in spaced parallel relationship to each other, a second pair of angle irons extending vertically in generally spaced parallel relationship to each other, and a steel plate affixed to the first and second pluralities of angle irons. A steel mesh material can be fixed to at least to the first plurality of angle irons so as to be positioned adjacent to the top surface of the base.

In the preferred embodiment of the present invention, the base comprises a concrete material, a plurality of reinforcing bars extending through the concrete, and a reinforcing plate of a generally U-shaped cross section positioned between the plurality of reinforcing bars.

The interior of the housing is positioned such that an interior thereof receives an exposed section of pipeline extending above the earth. The pipeline section is of a type having a valving connected thereto.

BRIEF DESCRIPTION OF THE SEVERAL VIEWS OF THE DRAWINGS

FIG. 7 is a detailed view showing the venting system at the top of the protective structure of the present invention.

FIG. 8 illustrates the mounting of the protective structure upon an anchor bolt extending from the base.

FIG. 9 is an illustration of how the protective structure of the present invention can be positioned upon the base.

DETAILED DESCRIPTION OF THE INVENTION

Figure 1:
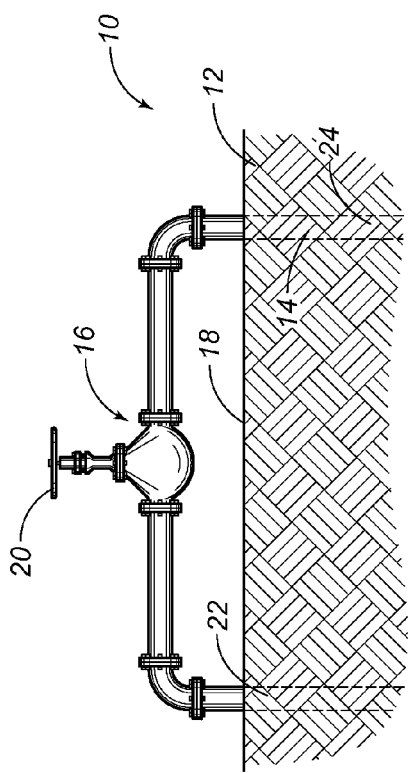
FIG. 1 is a side elevational view showing a typical exposed section of pipeline.

Referring to FIG. 1, there is shown the arrangement 10 of the pipeline as extending outwardly of the earth 12. As can be seen, the pipeline 14 will extend outwardly from the earth 12. A valving structure 16 is mounted on those portions of the pipeline 14 that extend upwardly above the top surface 18 of the earth. Valving structure 16 has a valve handle 20 rotatably mounted thereon. Another portion of the pipeline 14 will extend outwardly from the valving structure 16 and down into the earth. Each of the vertically extending portions 22 and 24 will connect with the pipeline extending through the earth 12.

Unfortunately, the exposed portions of the pipeline 14, as shown in FIG. 1, can cause disastrous consequences. For example, the valve handle 20 can easily be accessed by unwanted personnel. The rotation of the handle 12 can stop the flow of oil and gas through the pipeline. In other circumstances, where it is desired to maintain the closed condition of the pipeline 14, access to the handle 20, by undesired personnel, can cause an flow of fluid through the pipeline.

Additionally, and furthermore, the exposed portion of the pipeline 14 allows potential access by terrorists. For example, explosives could be located in the proximity of the valve section 16 on the surface 18 of the earth 12. The ignition of such explosives would destroy the valving section 16 and a significant portion of the pipeline 14. Since the exposed portions of the pipeline 14 are accessible above the earth 12, the prior art provides no means for protecting against such terrorist activities. It should be noted that, damage to the pipeline 14 also can be created by projectiles directed toward the area of the valving section 16 or the other exposed portions of the pipeline 14 above the earth 12. Still, in other circumstances, vandals can suitably access the exposed portions of the pipeline 14 so as to create problems for the companies that own the pipelines or for the users of the material conveyed by the pipeline 14. The present invention is intended to overcome such problems.

Figure 2:
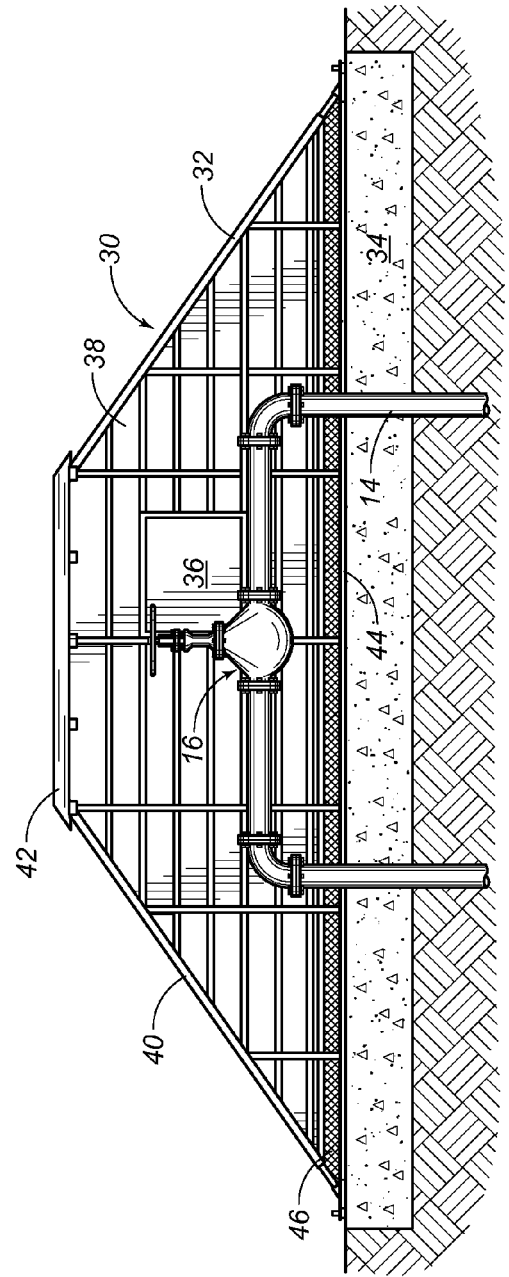
FIG. 2 is an illustration of the protective structure of the present invention as positioned over the exposed section of pipeline.
Figure 5:
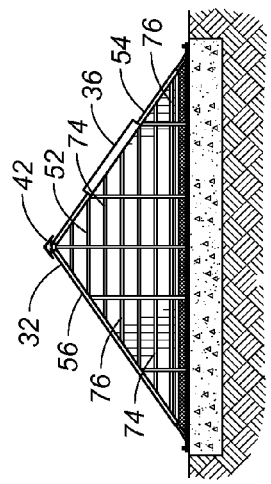
FIG. 5 is a cross-sectional end view showing the protective structure of the present invention.

FIG. 2 shows the protective structure 30 in accordance of the preferred embodiment of the present invention. The protective structure 30 includes a housing 32 that is affixed to a base 34. An access door 36 is provided on the protective housing 32 so as to allow access to the interior 38 of the protective housing 32.

In the present invention, it can be seen that the base 34 is formed of a concrete material having a generally rectangular shape. There is an interior central opening of the base 12 which allows the pipeline 14 to extend upwardly through the interior thereof. In other words, the base 34 can have a generally annular configuration. It can be seen that the valving structure 16 is positioned within the interior 38 of the housing 32.

The housing 32 includes a plurality of side walls 30 which extend upwardly from the base 34 at an acute angle with respect to the top surface 44 of base 34. A venting structure 42 is formed at the top of plurality of side walls 40 so as to allow air within the interior 38 of housing 32 to vent outwardly therefrom to the atmosphere. Each of the plurality of side walls 40 extend at an acute angle with respect to the base 34 so as to deflect any blasts, explosions or other impacts away from the pipeline 14 and its associated valving structure 16. In other words, if an explosive is placed in the proximity of the angled side walls 40, the angled nature of the side walls 40 will tend to deflect the blast rather than allow a full impact of the blast from affecting the housing 32. A steel mesh 46 is positioned adjacent to the top surface 44, of the base 34 so as to allow any liquids within the interior 38 of the protective housing 32 to drain easily therefrom. The steel mesh 46 will also prevent access to the interior 38 of housing 32.

Figure 3:
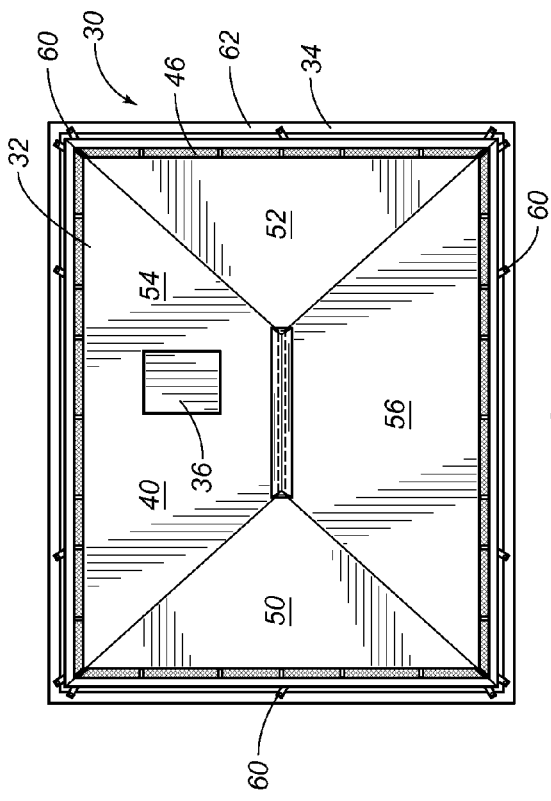
FIG. 3 is a plan view of the protective structure of the preferred embodiment of the present invention.

FIG. 3 shows a plan view of the protective structure 30 of the present invention. As can be seen, the plurality of side walls 40 includes a first end wall 50, a second end wall 52, a first side wall 54 and a second side wall 56. Each of the end walls 50 and 52 has a generally triangular configuration with a wide edge adjacent to the base 34. The venting structure 42 extends longitudinal across the top of the side walls 54 and 56 and between the pointed upper ends of the end walls 50 and 52. Each of the side walls 54 and 56 has a trapezoidal shape with a wide edge of the trapezoidal shape located adjacent to the base 34. Access door 36 is positioned at an opening on the side wall 54. Access door 36 can include suitably interiorly-mounted hinges. The door 36 can also be chain mounted to the structure 30 so as to avoid any removal therefrom. It can be seen that the protective housing 32 has a plurality of tabs 60 extending outwardly from the bottom edges thereof so as to be secured to anchor bolts associated with an apron 62 extending on the base 34. As can be seen, the periphery of the bottom of the protective housing 34 is positioned inwardly of the periphery of the base 34. Tabs 60 are suitably mounted so as to correspond with the location of anchor bolts embedded within the base 34. Each of the side walls 50, 52, 54 and 56 is of a painted steel plating. Steel mesh 46 is located adjacent to the bottom of the housing 32 and above the top surface of the base 34.

Figure 4:
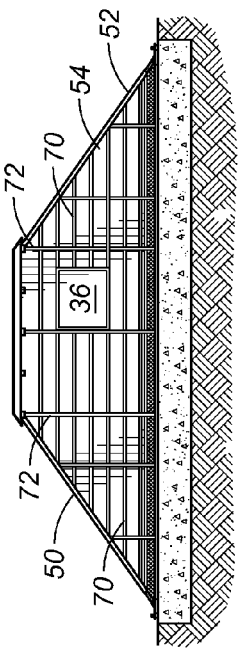
FIG. 4 is a cross-sectional side view showing the protective structure of the present invention.

FIG. 4 shows that each of the trapezoidal-shaped side walls 54 has a plurality horizontally extending angle irons 70 and a plurality of vertically extending angle irons 72. A steel plating is securely affixed, by welding, or by other means onto the angle irons 70 and 72. As can be seen, the upper ends of the vertically extending angle iron 72 serve to support at least a portion of the underside of the respective end walls 50 and 52.

FIG. 4 shows the interior structure of the end wall 52. End wall 52 also includes of plurality of horizontally extending angle irons 74 and a plurality of vertically extending angle irons 76. The steel plating associated with the end wall 52 is support on the angle irons 70 and 76. Access door 36 is illustrated as being mounted on the wall 54 so as to allow access to the interior of the protective housing 32. Vent 42 is positioned at the apex of the side walls 54 and 56.

Figure 6:
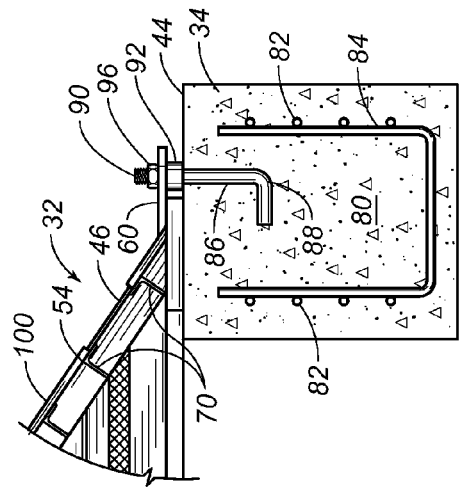
FIG. 6 is a detailed view showing the mounting of the protective structure of the present invention upon the concrete base.

FIG. 6 shows the manner in which the protective housing 32 of the present invention is secured to the base 34. The base 34 is formed of concrete material 80 which has reinforcing bars 82 extending longitudinally therethrough. Reinforcing plate 84 is positioned between the plurality of reinforcing bars 82. Reinforcing plate 84 has a generally U-shaped configuration. The combination of the reinforcing bars 82 and the reinforcing plate 84 provides the base 34 with an extremely strong steel/concrete construction.

Anchor bolt 86 has a portion 88 that is embedded into the concrete material 80 of base 34. Another portion 90 extends upwardly above the top surface 44 of the base 34. A spacer 92 will extend over the exposed portion 90 of the anchor bolt 86. A steel plate 94 is affixed to the side wall 54 and extends generally horizontally outwardly therefrom. A suitable threaded member 96 can be secured so as to affix the plate 94 onto the exposed portion 90 of the anchor bolt 88.

In FIG. 6, it can be seen that the steel mesh material 46 is positioned generally adjacent to the bottom of the protective structure 30. The steel mesh material 46 is secured to suitable horizontally arranged angle irons 70. The steel plate 100 of side wall 54 is also mounted onto the surface of the angle iron. The steel mesh 46 will allow any liquid accumulation within the interior 38 of the protective housing 32 to drain therefrom.

FIG. 7 shows the configuration of the vent 42. Vent 42 allows the interior 38 of the protective housing to vent to atmosphere. As such, any accumulation of gases within the interior of the 38 of the protective housing 32 can be suitably vented therefrom. This will prevent any potential hazards to workers that may have to enter through the access door for the purpose of manipulating the valving structure 16.

The vent 42 includes a cap 104 that is mounted on a first angle iron 106 and a second angle iron 108. The angle iron 106 has a surface affixed to the underside of one leg 110 of the inverted V-shaped cap 104. The angle iron 106 also has another surface which is affixed to the surface of side wall 56. The angle iron 108 has a surface that is affixed to another leg 112 of the inverted V-shaped cap 104. Angle iron 108 also has another surface that is affixed to the exterior surface of the plate 54.

FIG. 8 shows the manner in which the tab 60 extends outwardly from the bottom edge 120 of the protective housing 32. It can be seen that the tab 60 has a suitable hole 122 formed thereon. As a result, the threaded member 96, in the form of a bolt, can be applied onto a threaded portion associated with the exposed portion 90 of the anchor bolt 86.

In FIG. 9, the manner of positioning the protective housing 32 of the protective structure 30 is particularly illustrated. The cap 104 of the vent 42 has a pair of eyelets 130 and 132 affixed thereto and extending upwardly therefrom. A suitable lifting structure 134 in the form of cables extending from a crane can be secured to the respective eyelets 130 and 132. As such, the crane can easily be used so as to lift the protective structure 30 in a desired position onto the base 34. The housing 32 can be suitably manipulated so that the respective tabs 30 can be positioned onto the exposed portions of the anchors bolts 46.

It should be noted that the structure of the present invention prevents terrorist acts from affecting the pipeline. The configuration of the protective structure of the present invention will serve to deflect any blasts that could occur from the explosives or projectiles. The strong steel plating will suitably bulletproof so as to prevent bullets from being used to damage the pipeline structure. The access door 36 should be positioned in a location so as to avoid easy notice by passersbys. In other words, the access door 36 should be positioned away from any road passing adjacent to the protective structure 30. The vent 42 avoids any unwelcome accumulation of gases on the interior of the protective structure 30. Similarly, the mesh, located at the bottom of the protective structure, will allow for the easy drainage of any accumulated liquids from the interior of the protective structure. The protective structure can be suitably pre-manufactured and delivered to the desired site. The simple use of a crane can lower the structure 30 to its desired position over the pipeline structure. Once installed, the pipeline structure will be secure and greatly improve the life and integrity of the valving structure associated with the pipeline.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A structure for protecting pipelines comprising:
   a base having a top surface;
   a housing affixed to said top surface of said base, said housing having a plurality of side walls, each of said plurality of side walls extending at an acute angle with respect to said top surface of said base; and
   an accessing means connected to said housing in a position above said base, said accessing means for allowing access to an interior of said housing, each of said plurality of side walls comprising:
      a first plurality of angle irons extending horizontally in spaced parallel relation to each other;
      a second plurality of angle irons extending vertically in generally spaced parallel relationship to each other;
      a steel plate affixed to said first and second plurality of angle irons; and
      a steel mesh material affixed to said first plurality of angle irons, said steel mesh positioned adjacent said top surface of said base.

2. The structure of claim 1, said base having a generally rectangular shape with a central opening, said central opening suitable for allowing a portion of the pipeline to extend upwardly therethrough.

3. The structure of claim 1, said base being formed of a concrete material, said housing being affixed by a plurality of anchor bolts to said base, each of said plurality of anchor bolts having a portion embedded in said concrete material.

4. The structure of claim 1, said plurality of side walls comprising:
   a pair of triangularly-shaped walls each having a wide edge at said base, said pair of triangularly-shaped walls positioned at respective opposite end of said housing; and
   a pair of trapezoidal-shaped walls each having a wide edge at said base, said pair of trapezoidal-shaped walls respectively positioned on opposite sides of said housing and between said pair of triangularly-shaped walls.

5. The structure of claim 4, said accessing means being a door hingedly affixed over an opening in one of said pair of trapezoidal-shaped walls.

6. The structure of claim 1, said pair of side walls defining an opening at a top end thereof, said opening venting said interior of said housing to exterior atmosphere.

7. The structure of claim 6, said opening extending longitudinally along said top end, said structure further comprising:
   a cap supported in spaced relation over said opening.

8. The structure of claim 7, said cap comprising:
   an inverted V-shaped member having a pair of legs that extend outwardly over and beyond said opening;
   a first angle iron having a surface affixed to a surface of one of said plurality of side walls and another surface affixed to one said pair of legs of said inverted V-shaped member; and
   a second angle iron having a surface affixed to a surface of another of said plurality of side walls and another surface affixed to another of said pair of legs of said inverted V-shaped member.

9. The structure of claim 7, said cap having a pair of eyelets affixed thereto and extending upwardly therefrom.

10. The structure of claim 1, said base comprising:
   a concrete material;
   a plurality of reinforcing bars extending through said concrete; and
   a reinforcing plate of generally U-shaped cross-section positioned between said plurality of reinforcing bars.

11. A protective structure comprising:
   a pipeline section extending outwardly from the earth;
   a base embedded in the earth and extending around said pipeline section;
   a housing affixed to said base and extending upwardly therefrom, said housing having a top positioned above a top of said pipeline section, said pipeline section positioned entirely within an interior of said housing, said housing having a plurality of side walls; and
   an accessing means connected to said housing for allowing access to said interior of said housing from an exterior of said housing, each of said plurality of side walls comprising:
      a first plurality of angle irons extending horizontally in spaced parallel relation to each other;

a second plurality of angle irons extending vertically in generally spaced parallel relationship to each other;

a steel plate affixed to said first and second pluralities of angle irons; and a steel mesh material affixed to at least said first plurality of angle irons, said steel mesh positioned adjacent to a top surface of said base.

12. The protective structure of claim 11, said interior being vented to the atmosphere.

13. The protective structure of claim 11, each of said plurality of side walls extending at an acute angle with respect to a top surface of said base.

14. The structure of claim 11, said pipeline section having valving thereon.

15. The protective structure of claim 11, said accessing means being a door hingedly affixed over an opening in one of said plurality of side walls.

16. The apparatus of claim 11, said plurality of side walls comprising:

a pair of triangularly-shaped walls each having a wide edge at said base, said pair of triangularly-shaped walls positioned at respective opposite ends of said housing; and a pair of trapezoidal-shaped walls each having a wide edge at said base, said pair of trapezoidal-shaped walls respectively positioned on opposite sides of said housing and between said pair of triangularly-shaped walls.

17. The protective structure of claim 11, said plurality of side walls defining an opening at a top end thereof, said opening venting said interior of said housing to the exterior atmosphere, said opening extending longitudinally along said top end, the structure further comprising:

a cap supported in spaced relation over said opening.

* * * * *